_United States Patent Office_

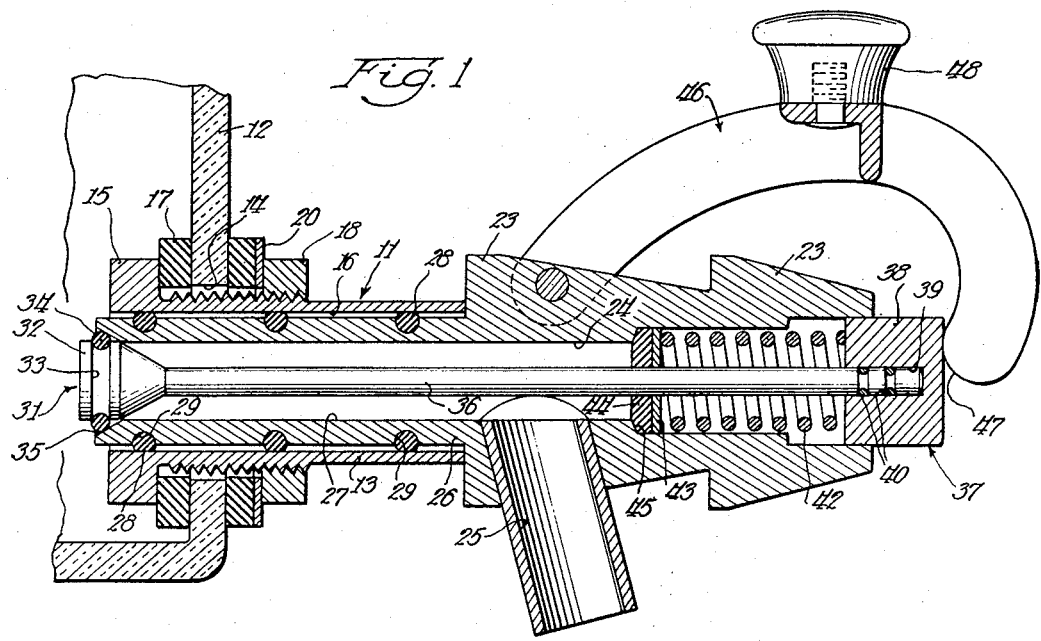

2,764,385
Patented Sept. 25, 1956

2,764,385
FAUCET

Edward H. Sieling, Chicago, Ill.

Application June 26, 1951, Serial No. 233,509

6 Claims. (Cl. 251—144)

The present invention relates to a faucet. More particularly, the invention relates to a faucet construction of the type adapted for use on containers of drinking liquids.

One of the primary problems to be overcome in a design of faucets for use on containers of liquids for human consumption, such as a coffee urn, is that of sanitation. In faucets intended for such use, it is absolutely necessary that the faucet construction lend itself to being cleaned with little difficulty because of the fact that personnel generally charged with cleaning such faucets are not inclined to apply themselves to thoroughly washing or cleansing inaccessible or hard-to-clean parts. Consequently, it is essential that the faucet construction be easily assembled and disassembled for cleaning, and not include any hard-to-clean portions, such as a threaded surface, which is exposed to the liquid in the container, and wherein accumulation of filth might occur.

It is therefore one object of the present invention to provide a faucet for use on containers of drinking liquids which can be easily and quickly disassembled for cleaning.

Another object of the invention is to provide a novel faucet construction for use on containers of drinking liquids that is adapted to be easily and thoroughly cleaned with a minimum of effort, and which does not have any relatively inaccessible, hard-to-clean portions exposed to the liquid in the container on which the faucet is used.

A further object of the invention is to provide a novel faucet construction which is relatively simple and inexpensive to manufacture.

A feature of the invention is the provision of a novel faucet construction wherein friction fitted parts are utilized to hold the faucet in assembled relation.

Another feature of the invention is the provision of a novel faucet construction wherein resilient O-ring gaskets are utilized to hold the various parts of the faucet in assembled relation.

Other objects, features, and many of the attendant advantages of this invention will be appreciated readily as the same becomes understood by reference to the following detailed description when considered in connection with the accompanying drawing, wherein similar parts in each of the several figures are designated by the same reference numeral, and wherein:

Fig. 1 is a sectional view, partly in elevation, of one form of a novel faucet constructed in accordance with the invention, and showing the same mounted on a container of liquids;

Fig. 2 is a plan view of a portion of a second form of the novel faucet construction which, in many respects, is identical to the faucet construction illustrated in Fig. 1; and Fig. 3 is a plan view of still another form of the faucet and is also identical in many respects to the form of the invention shown in Fig. 1.

Referring now to Figs. 1 and 2 of the drawings more particularly, a sanitary faucet constructed in accordance with the present invention is illustrated broadly at 11. The faucet 11 is mounted on a container for drinking liquids, such as a coffee urn, part of which is shown at 12. The faucet includes an externally threaded, tubular member 13 supported in an aperture 14 in one side wall of the container 12. The tubular member 13 has a flanged end portion 15 positioned within container 12, and an inner passageway 16 communicating with the interior of the container 12. Disposed between the flanged end 15 and the side wall of container 12 is a flexible annular gasket ring 17, and disposed between the outside surface of the wall of container 12 and a nut 18 is a second annular gasket ring 19 which, if desired, may have a hardened surface 20. The nut 18 serves to retain tubular member 13 in place on container 12, and upon drawing nut 18 up tightly, flanged end 15 is drawn up firmly against inner gasket ring 17. The inner gasket ring 17 then serves to sealably enclose the portion of the outer threaded surface of tubular member 13 adjacent flange 15, and prevents liquid from contacting the threaded surface. By this construction, the tubular member 13 can be readily secured to the container 12 without in any manner exposing the threaded surface thereon to the liquid within the container; thereby preventing the accumulation of rot and filth on the threaded surface, which is extremely hard to clean, and for that reason quite often neglected.

Supported by the tubular member 13 is a body member 23 having a passageway 24 therein which communicates with a discharge outlet 25 supported on the body member 23. Integral with the body member 23 is a second tubular member or tubular portion 26 which has an inner passageway 27 therein communicating with the passageway 24 in the body member. The tubular portion 26 is adapted to be press fit within the inner passageway 16 of the tubular member 13, the press fit being preferably accomplished by means of a plurality of O-ring gaskets 28 seated in a plurality of longitudinally spaced circumferential grooves 29 formed around the outer surface of the tubular portion 26. By reason of the press fit provided for the tubular portion 26 of faucet body member 23 within inner passageway 16, the body member 23 can be readily attached to or detached from the container 12, thereby allowing the body member to be easily removed for cleaning. Because of the novel manner in which the tubular portion 26 is frictionally supported within the inner passageway 16 of tubular member 13, no threaded or other hard-to-clean surfaces are exposed to the action of the liquid within the container; thereby assuring that the faucet will be thoroughly cleaned after disassembly.

Co-operating with the free end of the hollow tubular portion 26 of body member 23 is a movable valve member, indicated at 31. The movable valve member 31 comprises a cylindrically shaped disc 32 having a groove 33 formed around the periphery thereof, and a removable O ring 34 seated in the groove. The O ring 34 is adapted to engage a tapered surface 35 in the end of hollow tubular extension 26, and co-operate therewith in a disc valve fashion. The movable valve member 31 thus comprised is connected by means of a connecting link or valve stem 36 to a valve operating means, indicated broadly at 37. The valve operating means comprises a valve stem head portion or plunger 38, secured to the end of valve stem 36 opposite movable valve member 31, and slidably seated in the passageway 24 in body member 23 with a portion thereof outwardly accessible. In the preferred construction of the invention, the plunger 38 is secured to valve stem 36 by means of a central bore 39 formed therein which is frictionally engaged by a plurality of O rings 40 fitted in peripheral grooves longitudinally spaced along the end of valve stem 36. Co-operating with the plunger 38 is a compression spring 42 having one of the ends thereof engaging the plunger 38 and the other end thereof engaging a rigid disc 43. Disc 43 is slidably supported on valve stem 46, and is adapted to abut against an annular sealing gasket 44 seated on a shoulder 45 formed by the intersection of a greater diameter portion of passageway 24 with a lesser diameter portion of the passageway. By this construction, the compression spring 42 serves to normally bias plunger 38 outwardly, which action results in firmly seating movable valve member 31 on the valve seat formed by the tapered edge 35 of the hollow tubular portion 26 of member 23.

The movable valve member 31 is preferably constructed in such a manner that the outer diameter of the cylindrically shaped disc 32 is less than the cross sectional dimensions of the inner passageway 27 in hollow tubular extension 26, and the inner passageway 24 of body member 23, so that by removing the O ring 34, the cylindrically shaped disc 32 can be withdrawn through the inner passageways 27 and 24; thereby allowing the faucet assembly thus comprised to be readily disassembled for cleaning. Having removed cylindrical disc 32 and stem 36 from the body member 23, the component parts can then be readily disassembled and separately cleaned. The cleaning of these parts requires little or no concentration since each of these parts presents relatively smooth surface to the individual or person in charge of cleaning the parts. Thus, it is seen that the faucet construction is particularly adapted for use on containers of liquid for human consumption wherein the maintenance of sanitary conditions requires a faucet construction that may be thoroughly cleaned with a minimum of effort and attention.

If the faucet is to be used on a container of cool liquids, the construction heretofore described, and illustrated in Fig. 2, will suffice; however, if the faucet is to be used on a container of hot liquids, it is desirable that an additional operating lever 46 be provided, as in the form of the invention shown in Fig. 1. Referring to Fig. 1, the operating lever 46 comprises a forked, arcuately shaped member having each of the leg portions thereof pivotally secured to the body member 23 by any well-known means, and the end thereof opposite the pivoted end having a cam shape, as at 47, adapted to co-operate with the outwardly accessible portion of plunger 38 to cause the same to be depressed within body member 23 against the action of biasing spring 42. Secured to arcuately shaped member 46 is a handle grip 48 preferably constructed of an insulating material which protects the hand of the individual operating the faucet.

A second form of the embodiment of the invention adapted for use with hot liquids is illustrated in Fig. 3 of the drawing. In the form shown in Fig. 3, a pivoted, operating lever 49, identical in practically every respect to operating lever 46 of the form of the invention shown in Fig. 1, is pivotally secured to the body member 23 by means of a pair of projections 51 formed on the ends of the inner face of the leg portions of the forked member 49, the projections 51 being seated in a pair of oppositely disposed depressions in the side of body member 23. By this construction, the operating lever 49 can readily be secured to, or removed from the body member 23 by spreading the forked leg portions, and withdrawing the projections 51 from their co-operating depressions. Thus, with the form of the invention shown in Fig. 3, the operating lever 49 may or may not be attached, depending upon whether or not the faucet is to be used for cool or hot liquids.

From the foregoing description it can be appreciated that the invention provides a faucet for use on containers of drinking liquids which is adapted to be easily and quickly disassembled for cleaning. The faucet has no relatively inaccessible or hard-to-clean surfaces which are exposed to the action of the liquid so that after disassembly, the parts thereof can be readily cleaned without requiring concentrated attention. Further, it is relatively simple in design, and adapted to be manufactured inexpensively.

Having thus described my invention, it is obvious that various immaterial modifications may be made in the same without departing from the spirit of my invention; hence, I do not wish to be understood as limiting myself to the exact form, construction, arrangement, and combination of parts herein shown and described, or uses mentioned.

What I claim as new and desire to secure by Letters Patent is:

1. A sanitary faucet for a liquid container having an aperture in a wall thereof, comprising an externally threaded hollow tubular member having an inner passageway and adapted to be secured to the aperture in a side of the liquid container upon assembly, means cooperating with the threaded external portion of said tubular member upon assembly to the container for securing said tubular member to the liquid container with the inner passageway in said tubular member communicating with the interior of said liquid container, gasket means cooperating with said tubular member and the side of the container for sealably enclosing the threaded external portion of said tubular member from liquid within said container, a second hollow tubular member having inner passageways and complementally formed to the inner passageway of the first-mentioned hollow tubular member and adapted to be detachably affixed within the inner passageway in said first-mentioned tubular member, axially spaced O ring gaskets fitted around the periphery of the second tubular member and adapted for sealing and detachably securing the second tubular member within the inner passageway of the first-mentioned tubular member, a valve seat formed on the end of said second tubular member adjacent the interior of the container, a movable valve member supported in said second tubular member and cooperating with said valve seat for controlling the flow of liquid through said second tubular member, said movable valve member comprising a cylindrically shaped disk having a groove formed around the periphery thereof, and a removable O ring gasket fitted around said grooved disk, said O-ring gasket of said valve means being larger than the inner diameter of said inner passageway of said second hollow tubular member and seating on the end of said second hollow tubular member contiguous to the inner end of the passageway thereof and adapted for removal from said valve means permitting the axial removal of said valve means from said second hollow tubular member, the diameter of the disk being less than the cross-sectional dimensions of the inner passageways of said second tubular member permitting attaching and detaching of said valve means through the second hollow tubular member, and outer passageway provided by said inner passageways at the outer end thereof larger in diameter than the inner passageways at the inner end of the body member for operatively receiving the disk of the movable valve member, a shoulder formed at the juncture of said inner passageways within the body member, externally accessible valve operating means supported on said second tubular member and comprising spring means operatively mounted within said outer enlarged passageway, connecting link means extending through the inner passageways in said second tubular member operatively connecting said movable valve member and said valve operating means, and gasket means operatively mounted on said connecting link means and biased by said spring means against the aforesaid shoulder for sealing the outer enlarged passageway from the smaller portion of the inner passageways.

2. A sanitary faucet for a liquid container, said faucet including an externally threaded hollow tubular member having an inner passageway and adapted to be secured to a side of the liquid container upon assembly, means cooperating with the external threaded portion of said member upon assembly for securing said tubular member to said liquid container with the inner passageway in said tubular member communicating with the interior of said liquid container, a body member having an axial passageway therein extending to the exterior of the body member and communicating with a discharge outlet and having a hollow tubular portion thereon having an inner passageway, the inner passageway of said hollow tubular portion communicating with the passageway in said body member, said hollow tubular portion having a plurality of spaced O-ring gaskets fitted around the periphery thereof and being adapted to be frictionally held within the inner passageway in said first-mentioned tubular member by means of said O-ring gaskets, a valve seat formed on the free end of said tubular portion, a movable valve member supported in said tubular portion and cooperating with said valve seat for controlling the flow of liquid through said tubular portion, the passageway in said body member and the discharge outlet thereof, said movable valve member comprising a cylindrically shaped disk having a groove formed around the periphery thereof, and a removable O-ring gasket fitted around said grooved disk, the diameter of the disk being less than the cross-sectional dimensions of the inner passageways of said tubular portion and said body member permitting axial removal of said valve member through the outer end of said passageway in said body member, said removable O-ring gasket for said grooved disk of said valve member being larger than the inner diameter of said inner passageway of said hollow tubular portion and seated on the valve seat of said tubular portion and adapted for axial removal of said valve member permitting the axial removal of said valve member through the axial passageway and through the outer end of said body member, an outer enlarged passageway provided in said inner passageway at the outer end thereof larger in diameter than the inner passageway at the inner end of the body member for operatively receiving the disk of the movable valve member, a shoulder formed at the juncture of said passageways within the body member, externally accessible valve operating means supported on said body member and comprising spring means operatively mounted within said outer enlarged passageway, connecting link means extending through the inner passageways in said tubular portion and said body member operatively and detachably connecting said movable valve member and said valve operating means permitting detachment of said valve operating means from said valve member, and gasket means operatively mounted on said connecting link means and biased by said spring means against the aforesaid shoulder for sealing the outer enlarged passageway from the smaller portion of the inner passageway.

3. A sanitary faucet for a liquid container and including an externally threaded hollow tubular member having an inner passageway and adapted to be secured to the side of the liquid container upon assembly, means cooperating with the external threaded portion of said member upon assembly for securing said tubular member to said liquid container with the inner passageway in said threaded tubular member communicating with the interior of said liquid container, gasket means cooperating with said tubular member and the side of the container for sealably enclosing the threaded external portion of said tubular member from liquid within said container, a body member having an axial passageway therein extending to the exterior of the body member and communicating with a discharge outlet and having a hollow tubular portion thereon having an inner passageway, the inner passageway of said hollow tubular portion communicating with the passageway in said body member, said hollow tubular portion having a plurality of spaced frictional gaskets fitted around the periphery thereof and being adapted to be frictionally held within the inner passageway in said first-mentioned tubular member by means of said frictional gaskets whereby said second tubular member is detachably connected and sealed within the first-mentioned tubular member, a valve seat formed on the free end of said tubular portion, a movable valve member supported in said tubular portion and cooperating with said valve seat formed on the inner end of the hollow tubular portion of the body member for controlling the flow of liquid through said tubular portion, the passageway in said body member and the discharge outlet thereof, said movable valve member comprising a cylindrically shaped disk having a groove formed around the periphery thereof, and a removable O-ring gasket fitted around said grooved disk, the diameter of the disk being less than the cross-sectional dimensions of the inner passageways of said tubular portion and said body member permitting axial removal of said valve member through the axial passageway of said body member, externally accessible valve operating means comprising a plunger slidably seated in a portion of the inner passageway in said body member, a portion of the plunger being exteriorly accessible of said body member, connecting link means extending through the inner passageways in said tubular portion and said body member and operatively connecting said movable valve member and said plunger and permitting axial removal of said valve member through the axial passageway of said body member, means for normally maintaining said valve member in the closed position, and an operating lever operatively mounted on said body member and having a cam surface portion adapted to engage the accessible portion of said plunger for controlling the operation of said valve means.

4. A sanitary faucet for a liquid container and including an externally threaded hollow tubular member having an inner passageway and adapted to be secured to the side of the liquid container upon assembly, means cooperating with the external threaded portion of said member upon assembly for securing said tubular member to said liquid container with the inner passageway in said threaded tubular member communicating with the interior of said liquid container, gasket means cooperating with said tubular member and the side of the container for sealably enclosing the threaded external portion of said tubular member from liquid within said container, a body member having an axial passageway therein extending to the exterior of the body member and communicating with a discharge outlet and having a hollow tubular portion thereon having an inner passageway, the inner passageway of said hollow tubular portion communicating with the passageway in said body member, said hollow tubular portion having a plurality of spaced frictional gaskets fitted around the periphery thereof and being adapted to be frictionally held within the inner passageway in said first-mentioned tubular member by means of said frictional gaskets whereby said second tubular member is detachably connected and sealed within the first-mentioned tubular member, a valve seat formed on the free end of said tubular portion, a movable valve member supported in said tubular portion and cooperating with said valve seat formed on the inner end of the hollow tubular portion of the body member for controlling the flow of liquid through said tubular portion, the passageway in said body member and the discharge outlet thereof, said movable valve member comprising a cylindrically shaped disk having a groove formed around the periphery thereof, and a removable O-ring gasket fitted around said grooved disk, the diameter of the disk being less than the cross-sectional dimensions of the inner passageways of said tubular portion and said body member permitting axial removal of said valve member through the axial passageway of said body member, externally accessible valve operating means comprising a plunger slidably seated in a portion of the inner passageway in said body member, a portion of the plunger being exteriorly accessible of said body member, connecting link means extending through the inner passageways in said tubular portion and said body member and operatively connecting said movable valve member and said plunger and permitting axial removal of said valve member through the axial passageway of said body member, means for normally maintaining said valve member in the closed position, an operating lever for actuating said valve operating means, means for operatively mounting said operating lever associated with said body member, and said operating lever provided with a cam surface portion adapted to engage the accessible portion of said plunger for controlling the operation of said valve means.

5. An operator-operated sanitary faucet for a liquid container and including an externally threaded hollow tubular member having an inner passageway and adapted to be secured to the side of the liquid container upon assembly, means cooperating with the external threaded portion of said member upon assembly for securing said tubular member to said liquid container with the inner passageway in said threaded tubular member communicating with the interior of said liquid container, gasket means cooperating with said tubular member and the side of the container for sealably enclosing the threaded external portion of said tubular member from liquid within said container, a body member having an axial passageway therein extending to the exterior of the body member and communicating with a discharge outlet and having a hollow tubular portion thereon having an inner passageway, the inner passageway of said hollow tubular portion communicating with the passageway in said body member, said hollow tubular portion having a plurality of spaced frictional gaskets fitted around the periphery thereof and being adapted to be frictionally held within the inner passageway in said first-mentioned tubular member by means of said frictional gaskets whereby said second tubular member is detachably connected and sealed within the first-mentioned tubular member, a valve seat formed on the free end of said tubular portion, a movable valve member supported in said tubular portion and cooperating with said valve seat formed on the inner end of the hollow tubular portion of the body member for controlling the flow of liquid through said tubular portion, the passageway in said body member and the discharge outlet thereof, said body portion formed at its forward end with an enlarged portion and a reduced portion to the rear thereof whereby the sides of the fingers of an operator are received in the reduced portion in the operator-operated position so that the thumb of the operator may actuate the movable valve member, the enlarged body portion restraining the outward movement of the fingers, said movable valve member comprising a cylindrically shaped disk having a groove formed around the periphery thereof, and a removable O-ring gasket fitted around said grooved disk, the diameter of the disk being less than the cross-sectional dimensions of the inner passageways of said tubular portion and said body member permitting axial removal of said valve member through the axial passageway of said body member, externally accessible valve operating means comprising a plunger slidably seated in a portion of the inner passageway in said body member, a portion of the plunger being exteriorly accessible of said body member, connecting link means extending through the inner passageways in said tubular portion and said body member and operatively connecting said movable valve member and said plunger and permitting axial removal of said valve member through the axial passageway of said body member, and means for normally maintaining said valve member in the closed position.

6. A sanitary faucet for a liquid container and including an externally threaded hollow tubular member having an inner passageway and adapted to be secured to the side of the liquid container upon assembly, means cooperating with the external threaded portion of said member upon assembly for securing said tubular member to said liquid container with the inner passageway in said threaded tubular member communicating with the interior of said liquid container, gasket means cooperating with said tubular member and the side of the container for sealably enclosing the threaded external portion of said tubular member from liquid within said container, a body member having an axial passageway therein extending to the exterior of the body member and communicating with a discharge outlet and having a hollow tubular portion thereon having an inner passageway, the inner passageway of said hollow tubular portion communicating with the passageway in said body member, said hollow tubular portion having a plurality of spaced frictional gaskets fitted around the periphery thereof and being adapted to be frictionally held within the inner passageway in said first-mentioned tubular member by means of said frictional gaskets whereby said second tubular member is detachably connected and sealed within the first-mentioned tubular member, a valve seat formed on the free end of said tubular portion, a movable valve member supported in said tubular portion and cooperating with said valve seat formed on the inner end of the hollow tubular portion of the body member for controlling the flow of liquid through said tubular portion, the passageway in said body member and the discharge outlet thereof, said movable valve member comprising a cylindrically shaped disk having a groove formed around the periphery thereof, and a removable O-ring gasket fitted around said grooved disk, the diameter of the disk being less than the cross-sectional dimensions of the inner passageways of said tubular portion and said body member permitting axial removal of said valve member through the axial passageway of said body member, said removable O-ring gasket for said grooved disk of said valve member being larger than the inner diameter of said inner passageway of said hollow tubular portion and seated on the valve seat of said tubular portion and adapted for removal of said valve member permitting the axial removal of said valve member through the axial passageway and through the outer end of said body member, an outer enlarged passageway provided in said inner passageway at the outer end thereof larger in diameter than the inner passageway at the inner end of the body member for operatively receiving the disk of the movable valve member, a shoulder formed at the juncture of said passageways within the body member, externally accessible valve operating means comprising a plunger slidably seated in a portion of the inner passageway in said body member and comprising spring means operatively mounted within said outer enlarged passageway, said plunger being exteriorly accessible of said body member, connecting link means extending through the inner passageways in said tubular portion and said body member and operatively connecting said movable valve member and said plunger and permitting axial removal of said valve member through the axial passageway of said body member, gasket means operatively mounted on said connecting link means and biased by said spring means against the aforesaid shoulder for sealing the outer enlarged passageway from the smaller portion of the inner passageway, said spring means also normally maintaining said valve member in the closed position, said connecting link means comprising a relatively long rod connected to said valve member at one of the ends thereof, and complementally formed means on said plunger for detachably connecting said plunger from the outer end of said rod complementally formed to detachably affix the plunger upon removal of said connecting link means from the axial passageway of the body member.

References Cited in the file of this patent

UNITED STATES PATENTS

| | | |
|---|---|---|
| 351,848 | Brown | Nov. 2, 1886 |
| 599,158 | Andriveau | Feb. 15, 1898 |
| 889,912 | Davis | June 9, 1908 |

(Other references on following page)

UNITED STATES PATENTS

| | | |
|---|---|---|
| 1,220,694 | Schweinert | Mar. 27, 1917 |
| 1,416,228 | Minnis | May 16, 1922 |
| 1,845,736 | Anderson | Feb. 16, 1932 |
| 1,982,071 | Roberts | Nov. 27, 1934 |
| 2,144,427 | Longstreet | Jan. 17, 1939 |
| 2,200,396 | Martin | May 14, 1940 |
| 2,372,081 | Haldane | Mar. 20, 1945 |
| 2,380,608 | Palm | July 31, 1945 |
| 2,388,026 | Ward | Oct. 30, 1945 |
| 2,417,242 | Eckel | Mar. 11, 1947 |
| 2,479,997 | Brown | Aug. 23, 1949 |
| 2,508,843 | Semak | May 23, 1950 |
| 2,517,061 | Von Stackelberg | Aug. 1, 1950 |
| 2,551,393 | Pinger | May 1, 1951 |
| 2,554,747 | Lee | May 29, 1951 |
| 2,578,797 | Gordinier | Dec. 18, 1951 |
| 2,612,342 | Terry | Sept. 30, 1952 |
| 2,630,131 | Snyder | Mar. 3, 1953 |
| 2,669,739 | Winberg | Feb. 23, 1954 |